July 2, 1963   W. E. WOOLLENWEBER, JR., ETAL   3,096,126
ANTI-WHIRL BEARING
Filed Sept. 26, 1960   4 Sheets-Sheet 1

INVENTOR.
JAMES A. HARDY
GERHARD PAUL
BY WILLIAM E. WOOLLENWEBER, JR.

Lockwood, Woodard, Smith & Weikart
ATTORNEYS 50,000 R.P.M.

60,000 R.P.M.

70,000 R.P.M.

78,000 R.P.M.

50,000 R.P.M.

60,000 R.P.M.

70,000 R.P.M.

80,000 R.P.M.

United States Patent Office 3,096,126
Patented July 2, 1963

3,096,126
ANTI-WHIRL BEARING

William E. Woollenweber, Jr., Columbus, Ind., James A. Hardy, Playa Del Rey, Calif., and Gerhard Paul, Indianapolis, Ind., assignors to Schwitzer Corporation, Indianapolis, Ind., a corporation
Filed Sept. 26, 1960, Ser. No. 58,410
4 Claims. (Cl. 308—9)

This invention relates generally to bearing structures and more particularly it relates to bearings especially adapted for use in high speed machinery, such for example, as high speed air compressing devices.

This invention is a modification of that disclosed in our copending application, Serial No. 831,284, filed August 3, 1959, now Patent No. 3,056,634.

It is conventional to provide, in high speed machinery, anti-friction bearings and such bearings permit relatively high speed of shaft rotation. For example, speeds of the order of 60,000 to 80,000 revolutions per minute are attainable. However, such bearings have very limited life. Such limited life is tolerable in military aircraft applications where it is customary to repair or rebuild much of the mechanical equipment of the aircraft periodically, and after rather short periods of time. Such limited life is not tolerable in commercial application.

High speed machinery, such as turbine driven air compressors for supercharging internal combustion engines, has been adopted widely for use on engines used for driving automobile trucks, tractors and as stationary power sources.

For these applications of turbine driven compressors the bearing structure must be adaptable to mass production methods and must be economical to manufacture. Also, such bearing structure must have relatively long life and must not be subject to break down at relatively short intervals. Anti-friction bearings for high speed machinery are excessively expensive and have too short an operating life for application to turbine driven air compressors used on internal combustion engines of the type previously described.

It is also conventional to provide sleeve bearings for high speed machinery of all types including turbine driven air compressors. However, the speed of rotation of such machinery has been limited because of the inability of sleeve bearings to tolerate a practical degree of unbalance in the rotating parts. Conventional sleeve bearings are also objectionable in that they are incapable of damping resonant vibrations of the rotating parts at critical speeds.

It has been conventional practice to equip internal combustion engines with air compressors for the purpose of increasing the power output of the engines by increasing the quantity of air fed to the combustion chamber of the engines. Rotational speeds of approximately 50,000 revolutions per minute have been tolerable with conventional sleeve bearings, but there is a constant demand for more power output from present internal combustion engines and one way of accomplishing such increase of power output without redesigning the engine is by increasing the rotational speed of the air input compressor. The phenomenon of "oil film whirl" or "shaft whipping" has prevented increase of rotational speeds because this phenomenon in the journal bearings causes the shaft to whirl or whip instead of rotating about a stationary center. This phenomena is described in "Mechanical Vibrations" by Don Hartog, 2d edition, published in 1940 by McGraw-Hill Publishing Company, Inc. The shaft whirls in such a manner that its center travels through a circular or modified circular path. Bearing clearances limit such whirling motion, but at speeds of the order of 80,000 revolutions per minute or more, it is found that the load on the bearing and the lubricating oil film dynamics are such that the oil film breaks down, thereby causing metal to metal contact and rapid wear of the bearings.

When operating speeds of rotating machinery are increased beyond present conventional levels, excessive oil film whirl may be prevented to a degree by having relatively small clearances between the bearing and the journal. With such clearance, the rotating shaft has little or no freedom to move from the geometric center of the bearing. However, it is found that conventional sleeve bearings are still not satisfactory when clearances are so reduced.

Accordingly, the principal object of this invention is to provide a bearing structure for high speed machinery of such nature that shaft whirl is reduced to a minimum.

Another object of this invention is to provide a bearing structure which will permit substantial increase of normal operating speed of rotation of high speed machinery.

Still another object of this invention is to provide a bearing structure for high speed machinery which will tolerate unbalance in the rotating parts thereof.

Still another object of this invention is to provide a bearing structure inherently capable of providing relatively large damping effect and consequent suppression of vibration of rotating parts.

A further object of this invention is to provide a bearing structure for high speed machinery which includes a floating bushing and wherein the phenomenon of "oil film whirl" or "shaft whipping" is suppressed by using oil pressure on the surfaces of said bushing to inhibit rotation of said bushing.

In accordance with this invention there is provided a bearing structure for high speed machinery comprising a bearing housing having at least one journal box, a bushing mounted within said journal box and having substantial clearance with respect thereto, a shaft having a bearing surface disposed within said bushing, said bushing having an internal diameter somewhat larger than the diameter of said shaft, a source of lubricant under pressure for creating a film of lubricant between said bushing and said journal box and a film of lubricant between said bushing and said shaft, the area of said bushing and the lubricant pressure being related in a manner to create drag forces on said bushing of such magnitude as to inhibit rotation of said bushing with respect to said journal box.

The full nature of the invention will be understood from the accompanying drawings and the following description and claims:

Figure 1:
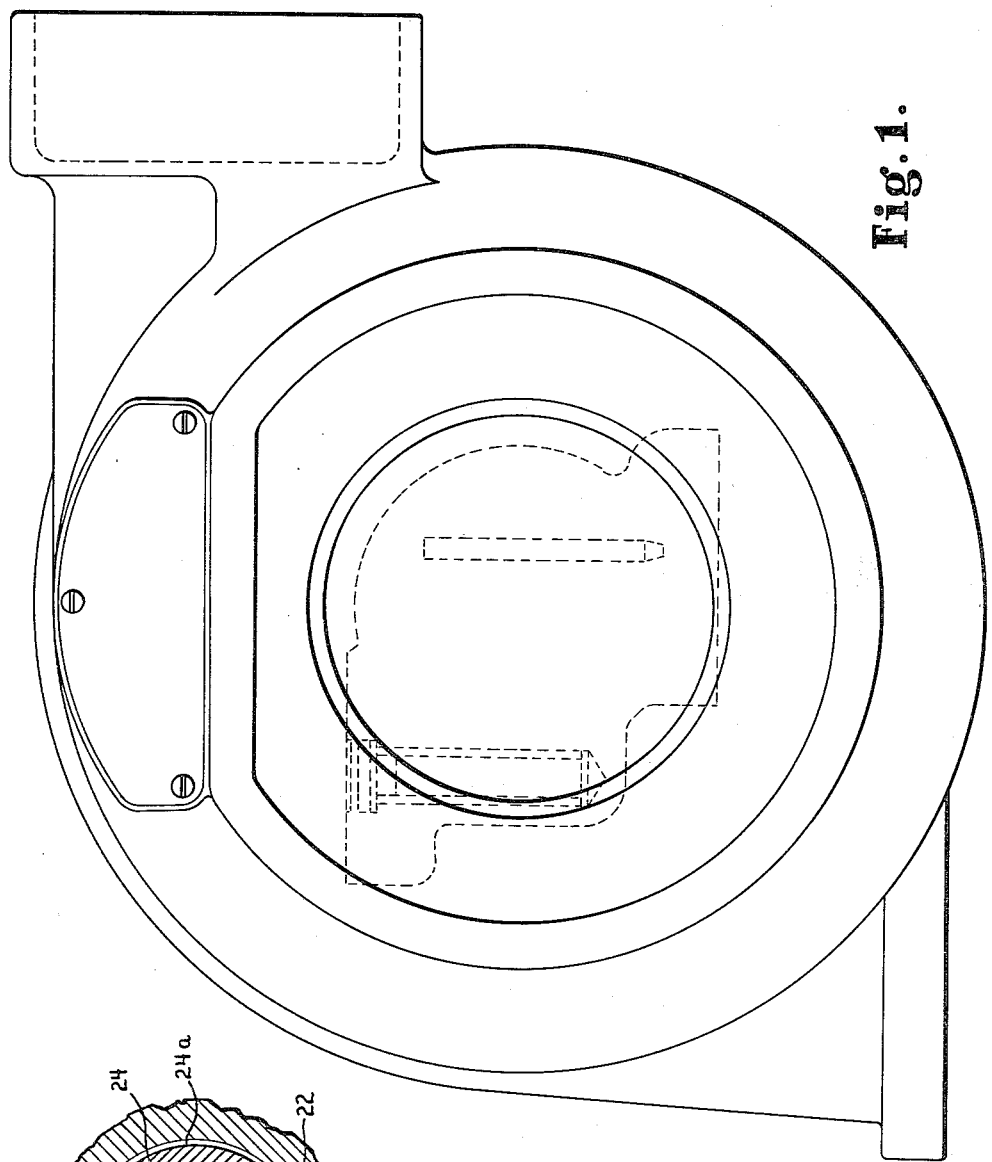
FIG. 1 is an end elevation of an air compressing device embodying the bearing structure of this invention.
Figure 2:
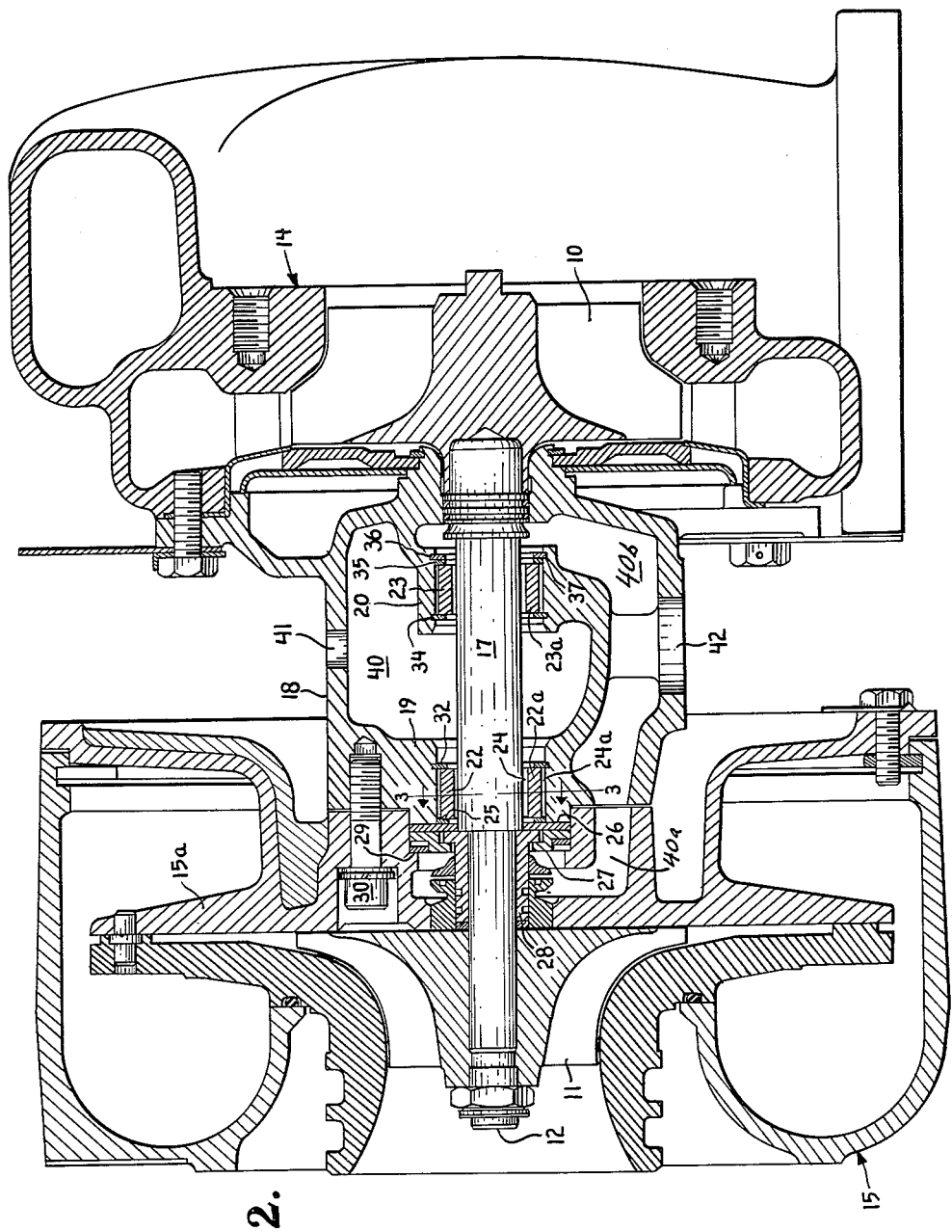
FIG. 2 is a longitudinal cross section of the air compressing device illustrated in FIG. 1.

Referring to FIGS. 1 and 2 of the drawings the invention is illustrated as a part of a turbine driven high speed centrifugal air compressor, but it will be readily understood by those skilled in the art, that this invention may be applied to many other forms of high speed machinery. The centrifugal air compressor wheel 11 is driven by a radial inflow turbine wheel 10 mounted on the common shaft 12 in conventional manner. The turbine wheel 10 cooperates with a housing and nozzle ring generally indicated at 14 having chambers designed in conventional manner so that wheel 10 may provide power to drive the centrifugal air compressor wheel 11, which in turn cooperates with a housing generally indicated at 15 having chambers of such character that rotation of wheel 11 will provide compressed air.

In accordance with this invention, the shaft 12 includes a journal portion 17 which is supported for rotation within a bearing housing 18 having journal boxes 19 and 20 for accommodating sleeve bearings or bushings 22 and 23 respectively. It is an important feature of this invention to provide substantial clearance between shaft 17 and the internal surfaces of bushings 22 and 23, as at 24 (FIG. 3) and likewise to provide substantial clearance between the internal surfaces of journal boxes 19 and 20 and the external surfaces of bushings 22 and 23, as at 24a. This permits the bushings to float on films of lubricant with respect to the shaft and the journal boxes.

Another important feature of this invention as compared to that disclosed in our previously identified copending application comprises increasing of the surface areas at the ends as indicated at 22a and 23a. This permits use of oil pressure for inhibiting rotation of the bushings relative to the journal box as will be explained.

The bushing 22 may be retained in the position shown in FIG. 2 by a first thrust washer 25, a second thrust washer 26, a third thrust washer 27 and a wave spring 29, members 26, 27 and 29 being clamped to the bearing housing 19 by a capscrew 30 acting through the section 15a of the outer housing 15. There is also provided a snap ring 32 which is received in an annular groove in journal box 19 as shown for retaining the bushing in operative position. A similar snap ring 34 is received within an annular groove in journal box 20, as shown, for retaining bushing 23 in its operative position. Thrust washer 35 and snap ring 36 seated within a groove 37 in journal box 20 serve to retain bushing 23 in proper operating position in journal box 20.

For providing oil films between the bushings and the shaft and particularly the bushings and the journal boxes, the bearing housing is formed to have an oil reservoir or chamber 40 into which oil may be fed under pressure. The bearing housing 18 is formed to provide an oil inlet at 41 which may be connected to a source of lubricating oil such, for example, as the oil supply of an internal combustion engine with which the air compressor is intended to cooperate. Thus, oil under pressure is always fed to chamber 40 while the engine is operating. A return oil line may be connected to an outlet port 42 whereby oil flowing through the bearing structure is returned to the oil reservoir of the engine.

In operation, shaft 17 is driven by the radial inflow turbine 10 with the exhaust gas from an internal combustion engine. The clearance between the bushings and the shaft and between the bushings and the journal boxes permit oil or other lubricant to form films between the shaft and the bushings, and between the bushings and the journal boxes. Thus, the bushings tend to float between the oil films.

Figure 4:
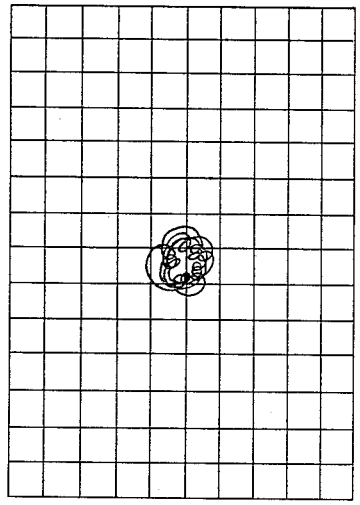
FIG. 4 is a graphical illustration of shaft motion in a conventional bearing structure at speeds of 50,000 r.p.m., 60,000 r.p.m., 70,000 r.p.m. and 78,000 r.p.m., respectively.
Figure 4:
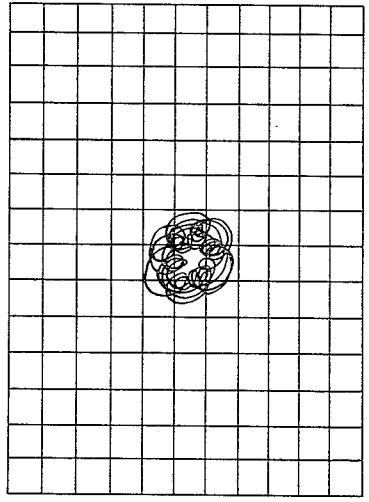
Figure 4:
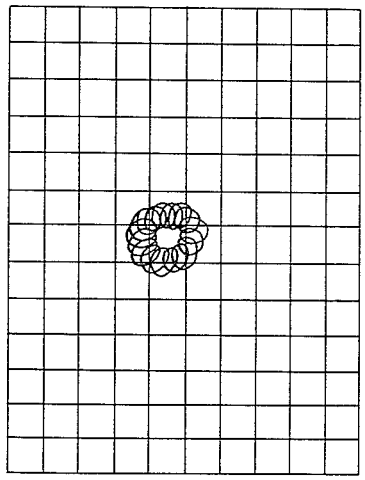
Figure 4:
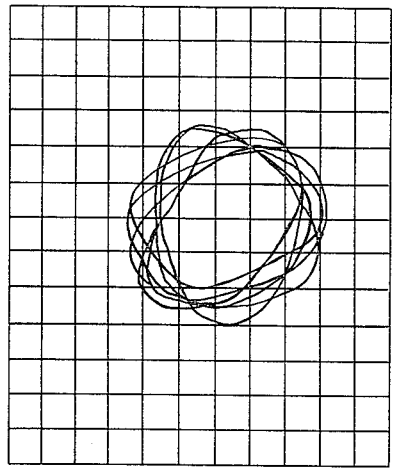

When the bushings float freely between the oil films it is found that there is excessive oil film whirl and shaft which as illustrated by FIG. 4. Tests have been made by means of electrical testing apparatus, including an oscilloscope. Each of the graphs in FIG. 4 represents the fluorescent screen of an oscilloscope on which is illustrated by the whirling lines the trace formed on the fluorescent screen by the electron beam. The trace of the electron beam represents the shaft whip which occurs at speeds of 50,000 r.p.m., 60,000 r.p.m., 70,000 r.p.m., and 78,000 r.p.m., in conventional turbine apparatus using bearings having bushings which are free to float between the oil films. At 50,000 r.p.m. the degree of shaft whip is not excessive, but at 78,000 r.p.m. the phenomena of oil film whirl causes excessive shaft whip to the extent that the oil films break down and cause rapid wear and destruction of the bearing.

Figure 3:
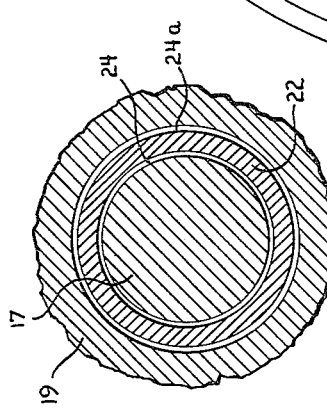
FIG. 3 is a cross section taken on line 3—3 of FIG. 2.

In order to suppress the phenomena of oil film whirl as indicated in FIG. 4, the bushings 22 and 23 are prevented from rotating at the full shaft speed by the loading exerted thereon in the form of pressure or drag created by the oil pressure on the end surfaces of bushings 22 and 23 and by the frictional drag on the surfaces of the bushing, the shaft surface and the surfaces of the journal boxes. For example, the oil pressure within the chamber 40 imposes longitudinal force on the exposed ends 22a and 23a of the bushings tending to push them endwise against their respective thrust washers 25 and 35. The oil flows between the bushing and the shaft through the clearance space indicated at 24 (FIG. 3) and between the bushing and the journal box in the clearance space indicated at 24a (FIG. 3). The oil films within the spaces at 24 and 24a also create a frictional drag on the bushings which is added to the drag effect created by the oil pressure on the ends of the bushings. It will readily be apparent that the oil flowing through the spaces indicated at 24 and 24a can flow between the abutting surfaces of thrust washers 25, 26 and 27 and thrust collar 28 into the chamber 40a, and out through the outlet port 42. Similarly, oil passes between the surfaces of thrust washer 35, snap ring 36 and into chamber 40b.

The drag or restraining torque which is created on the bushings 22 and 23 as described above is sufficient to prevent them from rotating to any substantial degree relative to the journal boxes 19 and 20. As a result, the shaft rotates at relatively high speed relative to the bushings, and the bushings rotate at relatively low speed with respect to the journal boxes.

Figure 5:
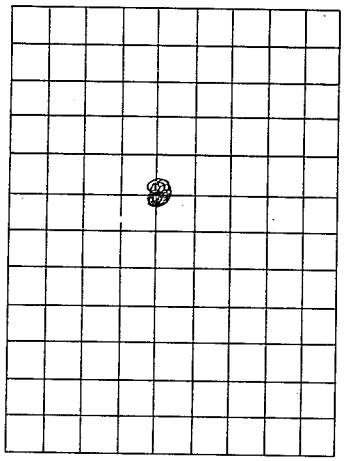
FIG. 5 is a graphical illustration of shaft motion in a bearing structure embodying the invention, at the indicated speeds and illustrating the stabilizing ability of this invention to suppress large amplitude of whirl of the shaft center.
Figure 5:
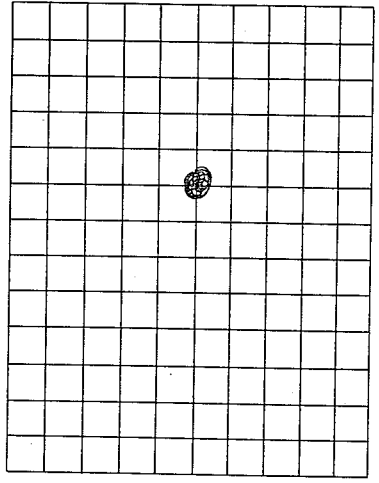
Figure 5:
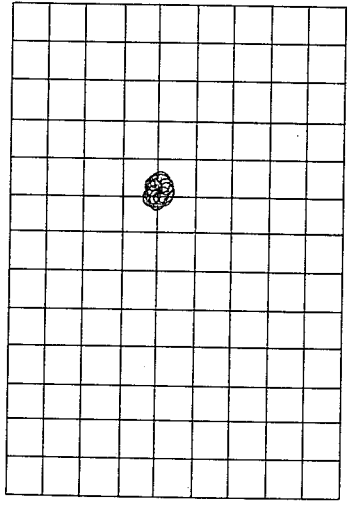
Figure 5:
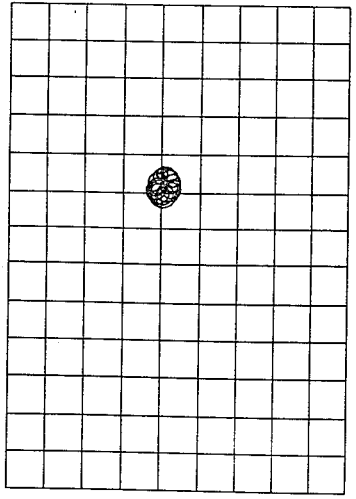

The structure described herein is found to permit speeds of rotation that heretofore have been impossible without encountering destructive whirling action of the shaft in conventional bearings or free floating bushings. FIG. 5 of the drawings also represents the trace of an electron beam on the screen of an oscilloscope by representing tests made on the bearing of this invention. FIG. 5 shows that the drag produced by friction and the application of end-loading or restraining torque by means of oil pressure reduce oil film whirl to such an extent that shaft whip is negligible. It will be noted that the trace of the cathode ray beam in FIG. 5 is greatly reduced in amplitude as compared with FIG. 4. This reduction in amplitude provides clear indication that the degree of shaft whip at speeds of from 50,000 r.p.m. to 80,000 r.p.m. is never sufficient to cause oil film whirl or to cause breakdown of the oil films. In other words, the movement of the shaft and the bushings never approaches the clearance between the journal box, the bushings, and the shaft.

From the foregoing description, it will be apparent that this invention provides a bearing structure capable of tolerating high speeds of rotation in various types of machines. FIGS. 4 and 5 of the drawings clearly illustrate the increase of speed of rotation which is obtainable in accordance with this invention. It should be understood, however, that the upper limits of speed attainable by the bearing structure of this invention are still unknown. The phenomenon of oil film whirl is reduced to a negligible quantity whereby breakdown of the film of lubricant is eliminated. Also, the necessity for relatively small clearance is eliminated so that the effects of centrifugal force do not cause excessive bearing loads. Furthermore, any slight unbalance in rotating parts is in effect neutralized by the special design of the bearing structure since the flexibility of the system allows the rotor to find and rotate about its true center of gravity.

This invention has the further advantage that it renders bearing structures relatively insensitive to oil pressure, oil temperature and oil viscosity. Conventional bearing structures are very sensitive to these factors insofar as oil film whirl is concerned. Experimental tests show that the bearing structure of this invention prevents oil film whirl and shaft whip through wide ranges of oil pressure, oil temperature and oil viscosity.

The results described herein are accomplished in part by means of the floating relationship of the bushing to the journal box and the shaft. This permits greater radial freedom of movement of the shaft because of the double oil film inside and outside of the bushing. The clearances between the bushing and the shaft on the one hand and between the bushing and the journal box on the other hand can be kept small enough to control oil film whirl. However, such clearances provide sufficient radial freedom to tolerate a greater amount of unbalance in the rotating parts than can be tolerated with a fixed bushing. Furthermore floating bushings provide a relatively large degree of damping to suppress vibration of the rotating parts. It is particularly to be noted that this invention provides a means for preventing any substantial degree of rotation of the bushing. Consequently, oil film whirl does not develop on the outside of the bushing and because of this, a wide range of clearance is possible between the outer surface of the bushing and the journal box. The outer oil film also helps to suppress any tendency for whirl to develop between the shaft and the bushing.

While this invention has been disclosed with particular reference to centrifugal air compressors directly connected by a common shaft to a turbine, it will be readily understood that the invention is not to be limited to use in any specialized type of machinery, but is applicable to many different types of high speed machinery.

The invention claimed is:

1. A bearing structure for high speed machinery comprising a bearing housing formed to provide a chamber and spaced aligned journal boxes on opposite sides of said chamber, thrust washers mounted at the outer ends of said journal boxes, a shaft disposed within said journal boxes, a pair of bushing members mounted over said shaft within said journal boxes with their facing ends exposed to said chamber and their other ends adjacent said thrust washers, said bushing members having clearance with respect to said shaft and said journal boxes sufficient to permit excessive oil film whirl and shaft whip at certain speeds of rotation, and a source of lubricant coupled to said chamber for providing a film of lubricant within said clearance spaces, said bushings having sufficient thickness at the exposed ends thereof to provide exposed areas of such magnitude that the pressure of the lubricant on said exposed ends forces said bushings against said thrust washers and inhibits rotation of said bushings with respect to said journal boxes to prevent said excessive oil film whirl and shaft whip.

2. A bearing structure for high speed machinery comprising a bearing housing formed to provide a chamber and spaced aligned journal boxes on opposite sides of said chamber, thrust bearings mounted at the outer ends of said journal boxes, a shaft disposed within said journal boxes, a pair of bushing members mounted over said shaft within said journal boxes with their facing ends exposed to said chamber and their other ends adjacent said thrust bearings, said bushing members having clearance with respect to said shaft and said journal boxes sufficient to permit excessive oil film whirl and shaft whip at certain speeds of rotation, and a source of lubricant coupled to said chamber for providing a film of lubricant within said clearance spaces, said bushings having exposed areas of such magnitude that the pressure of the lubricant on said exposed areas forces said bushings against said thrust bearings and inhibits rotation of said bushings with respect to said journal boxes to prevent said excessive oil film whirl and shaft whip.

3. A bearing structure for high speed machinery comprising a bearing housing formed to provide a chamber and a journal box exposed to said chamber, a thrust bearing mounted at the outer end of said journal box, a shaft disposed within said journal box, a bushing member mounted over said shaft within said journal box with one end exposed to said chamber and the other end adjacent said thrust bearing, said bushing member having clearance with respect to said shaft and said journal box sufficient to permit excessive oil film whirl and shaft whip at certain speeds of rotation, and a source of lubricant coupled to said chamber for providing a film of lubricant within said clearance space, said bushing having exposed area of such magnitude that the pressure of the lubricant on said exposed end forces said bushing against said thrust bearing and inhibits rotation of said bushing with respect to said journal box to prevent said excessive oil film whirl and shaft whip.

4. A bearing structure for high speed machinery comprising a journal box, a thrust bearing mounted at one end of said journal box, a shaft disposed within said journal box, a bushing member mounted over said shaft within said journal box with one end adjacent said thrust washer, said bushing member having clearance with respect to said shaft and said journal box sufficient to permit excessive oil film whirl and shaft whip at certain speeds of rotation, and a source of lubricant coupled to the other end of said journal box for providing a film of lubricant within said clearance space, said bushing having sufficient thickness at said other end thereof to provide an exposed area of such magnitude that the pressure of the lubricant on said other end forces said bushing against said thrust bearing and inhibits rotation of said bushing with respect to said journal box to prevent said excessive oil film whirl and shaft whip.

References Cited in the file of this patent

UNITED STATES PATENTS

| | | |
|---|---|---|
| 1,557,767 | Oliver | Oct. 20, 1925 |
| 2,471,187 | Atwater | May 24, 1949 |

FOREIGN PATENTS

| | | |
|---|---|---|
| 1,063,031 | France | Dec. 16, 1953 |